(12) United States Patent
  Abrahamsson

(10) Patent No.: US 10,479,336 B2
(45) Date of Patent: Nov. 19, 2019

(54) VEHICLE BRAKE SYSTEM

(71) Applicant: VOLVO CONSTRUCTION EQUIPMENT AB, Eskilstuna (SE)

(72) Inventor: Johan Abrahamsson, Strängnäs (SE)

(73) Assignee: Volvo Construction Equiptment AB, Eskilstuna (SE)

(*) Notice: Subject to any disclaimer, the term of this patent is extended or adjusted under 35 U.S.C. 154(b) by 34 days.

(21) Appl. No.: 15/735,635

(22) PCT Filed: Jul. 16, 2015

(86) PCT No.: PCT/SE2015/050825
§ 371 (c)(1),
(2) Date: Dec. 12, 2017

(87) PCT Pub. No.: WO2017/010923
PCT Pub. Date: Jan. 19, 2017

(65) Prior Publication Data
US 2018/0170337 A1    Jun. 21, 2018

(51) Int. Cl.
*B60T 13/20* (2006.01)
*B60T 13/22* (2006.01)
(Continued)

(52) U.S. Cl.
CPC .............. *B60T 13/20* (2013.01); *B60T 13/22* (2013.01); *B60T 13/261* (2013.01);
(Continued)

(58) Field of Classification Search
CPC ........ B60T 13/20; B60T 13/22; B60T 13/261; B60T 13/662; B60T 13/683; B60T 13/686; B60T 17/02
See application file for complete search history.

(56) References Cited

U.S. PATENT DOCUMENTS 3,944,286 A    3/1976    Engle et al.
4,018,140 A    4/1977    Engle
(Continued)

FOREIGN PATENT DOCUMENTS

EP    0642962 A2    3/1996
EP    1826085 A2    8/2007
(Continued)

OTHER PUBLICATIONS

International Search Report (dated Apr. 8, 2016) for corresponding International App. PCT/SE2015/050825.
(Continued)

*Primary Examiner* — Melanie Torres Williams
(74) *Attorney, Agent, or Firm* — Sage Patent Group

(57) ABSTRACT

The invention provides a vehicle brake system including
  a brake assembly providing a service brake and a parking brake having a brake disc assembly in common,
  a service brake circuit,
  a parking brake circuit, and
  a brake control arrangement adapted to control the service brake by selectively providing a fluid communication between a pressurising arrangement and the service brake via the service brake circuit, the brake control arrangement further being adapted to control the parking brake by selectively providing a fluid communication between the pressurising arrangement and the parking brake via the parking brake circuit, and by selectively draining the parking brake circuit,
  wherein the vehicle brake system includes a draining circuit adapted to drain the service brake circuit to avoid overload of the brake disc assembly.

19 Claims, 5 Drawing Sheets

(51) Int. Cl.
*B60T 13/66* (2006.01)
*B60T 13/68* (2006.01)
*B60T 17/02* (2006.01)
*B60T 13/26* (2006.01)

(52) U.S. Cl.
CPC .......... *B60T 13/662* (2013.01); *B60T 13/683* (2013.01); *B60T 13/686* (2013.01); *B60T 17/02* (2013.01)

(56) References Cited

U.S. PATENT DOCUMENTS

| | | |
|---|---|---|
| 4,856,222 A | 8/1989 | Hannam |
| 5,172,958 A | 12/1992 | Sell |
| 5,286,095 A | 2/1994 | Sell et al. |
| 2005/0252732 A1 | 11/2005 | Hashida et al. |
| 2014/0054956 A1 | 2/2014 | Kaupert |
| 2015/0330468 A1* | 11/2015 | Heren .................... F16D 65/853 303/10 |
| 2015/0367827 A1* | 12/2015 | Dix ......................... B60T 13/22 303/10 |
| 2016/0375880 A1* | 12/2016 | Farmer ................. B60T 8/1701 701/50 |

FOREIGN PATENT DOCUMENTS

| | | |
|---|---|---|
| EP | 2284056 A1 | 2/2011 |
| GB | 2310017 A | 8/1997 |
| GB | 2448007 A | 10/2008 |
| JP | 20461444927 A | 6/2006 |

OTHER PUBLICATIONS

European Official Action (dated Mar. 14, 2019) for corresponding European App. 15898414.6.

* cited by examiner

VEHICLE BRAKE SYSTEM

BACKGROUND AND SUMMARY

The invention relates to a vehicle brake system comprising a brake assembly providing a service brake and a parking brake having a brake disc assembly in common. The invention also relates to a working machine, a method for controlling a vehicle brake system, a computer program, a computer readable medium, and a controller for a vehicle brake system.

A working machine, e.g. a wheel loader or an articulated hauler, is usually provided with a bucket, container or other type of implement for digging, carrying and/or transporting a load.

For example, a wheel loader has a lift arm unit for raising and lowering an implement, such as a bucket. The lift arm comprises hydraulic cylinders for movement of a load arm and the implement attached to the load arm. Usually a pair of hydraulic cylinders is arranged for raising the load arm and a further hydraulic cylinder is arranged for tilting the implement relative to the load arm.

In addition, the working machine is often articulated frame-steered and has a pair of hydraulic cylinders for turning/steering the working machine by pivoting a from section and a rear section of the working machine relative to each other.

The hydraulic system generally further comprises at least one hydraulic pump, which is arranged to supply hydraulic power, i.e. hydraulic flow and hydraulic pressure, to the hydraulic cylinders. The hydraulic pump is driven by a power source, such as an internal combustion engine or an electric motor.

In a traditional driveline for a working machine, an internal combustion engine, usually a diesel engine, is provided, as well as a transmission, drive shafts, and wheel axle sets with hubs. However, alternative working machine drivelines may be considered, e.g. electric hybrid drivelines, with parallel or series hybrid configurations, or purely electric drivelines. A series electric hybrid driveline can comprise an internal combustion engine, a generator, an electric energy storage arrangement, power electronics, as well as electric motors and transmissions in the wheel hubs.

A typical working machine is also provided with service brakes as well as parking brakes. The service brakes are commonly of a wet multi-disc type with hydraulic application. For safety reasons, parking brakes are often arranged so as to be applied by a spring force and released with pressure acting against the spring force.

In a working machine with a traditional driveline, the parking brake is often mounted on or inside the driveline transmission, acting on the transmission output axle or the driveshaft. Thereby, one single parking brake assembly can act on all wheels of the working machine. However, this is not possible on a series electric hybrid driveline or an electric driveline with electric hub motors. Instead, parking brake assemblies need to be integrated in the wheel hubs of the working machine. Furthermore, due to the lack of space in the hub, it is advantageous to integrate the parking brake and service brake assemblies, by allowing the parking brake and the service brake to share disc assemblies.

Where service brake and parking brake functions share brake assemblies, if the service brake is applied while the parking brake is applied as well, there could be a risk that the brake assembly becomes overloaded due to the combined forces from the service brake circuit and the parking brake circuit. This could result is damages to the brake assemblies. For example the friction material of the brake discs can be overloaded, which in turn may damage the friction material.

A known solution to solve said problem with combined service brake and the parking brake forces is known as anti-compounding. This involves using the pressure of the service brake application to counteract the spring force of the parking brake, thereby reducing the parking brake force while the service brake force is applied. An example can be found in EP 1826085A2, suggesting a double check valve assembly which allows, if a spring activated parking brake is applied, for service brake pressure to be delivered to reduce the force that the spring exerts on the brake while the service brake function is applied.

A problem with known anti-compounding solutions rests in the fact that they are intimately linked with the design of the brake assembly. For example, the effective piston areas in the brake assembly, for the service brake actuation and the parking brake release, respectively, have to be mutually adapted so that a service brake application is balanced with a suitable compensation of the parking, brake release. This might complicate the design of the brake assembly, for example by providing a requirement that counteracts other requirements on the brake assembly.

It is desirable to avoid excessive brake forces in brakes with service as well as parking brake capacities, while providing flexibility to the design of the brakes.

A vehicle brake system according to an aspect of the invention is provided comprising
a brake assembly providing a service brake and a parking brake having a brake disc assembly in common,
a service brake circuit,
a parking brake circuit, and
a brake control arrangement adapted to control the service brake by selectively providing a fluid communication between a pressurising arrangement and the service brake via the service brake circuit, the brake control arrangement further being adapted to control the parking brake by selectively providing a fluid communication between the pressurising arrangement and the parking brake via the parking brake circuit, and by selectively draining the parking brake circuit,
wherein the vehicle brake system comprises a draining circuit adapted to drain, the service brake circuit to avoid overload of the brake disc assembly.

The working fluid of the vehicle brake system may be e.g. hydraulic fluid or air. It is understood that each circuit in the vehicle brake system comprises one or more conduits for control of respective functions in the system. It is also understood that the pressurising arrangement comprises suitable parts for pressurising the working fluid, e.g. a pump, and possibly a pressure accumulator. In addition, it is understood that the brake disc assembly can be any suitable type of brake disc assembly, e.g. including a wet brake or a dry brake.

The invention provides for the draining circuit to drain the service brake circuit. This could be done for example by releasing pressure in the service brake circuit to a pressure dumping device. Depending on the type of working fluid in the vehicle brake system, such a pressure dumping device could be a hydraulic return tank or to an air exhaust device.

The draining of the service brake circuit to avoid overload of the brake disc assembly differs from known anti-compounding solutions. More specifically, when applied to a brake system with a spring load activated and fluid pressure released parking brake, the invention provides for an attempt to activate the service brake, when the parking brake is engaged, to not change the braking force exerted by the spring of the parking brake. Instead any service brake pressure increase, resulting from the service brake activation attempt, may be diverted to a return tank or released.

Thus, as opposed to known anti-compounding solutions, the invention does not require the effective piston areas in the brake assembly to be mutually adapted, so that a service brake application is balanced with a suitable compensation of a parking brake release. This considerably simplifies the design of the brake assembly. Thus, with the invention excessive brake forces, in brakes with service as well as parking brake capacities, may be avoided, while flexibility to the design of the brakes is provided.

Preferably, the draining circuit is adapted to drain the service brake circuit while the parking brake circuit is drained. As understood from the reasoning above, where the parking brake is spring load activated and fluid pressure released, draining the service brake circuit while the parking brake circuit is drained, means that loads on the brake disc assembly from the service brake circuit cannot be added to the spring load of the parking brake.

As understood, for the spring load activation, the parking brake may comprise an elastic element adapted to provide or exert a force for the application of the parking brake. The elastic element could be a spring, e.g. a steel spring or a gas spring. The parking brake may present a parking brake piston and be adapted to be released by fluid pressure on the piston counteracting the three of the elastic element.

Preferably, the draining circuit is adapted to drain the service brake circuit via the parking brake circuit. Thereby, the draining circuit may comprise a non-return valve adapted to allow a fluid flow from the service brake circuit to the parking brake circuit, and to prevent a fluid flow from the parking brake circuit to the service brake circuit. In such embodiments, where the parking brake is spring, load activated and fluid pressure released, the pressure in the parking brake circuit when the parking brake is released, will prevent flow from the service brake circuit to the parking brake circuit via the non-return valve, and thereby the service brake may be applied upon suitable control of it. Also, the non-return valve will prevent any flow from the pressurised parking brake circuit to the service brake circuit, when the latter is not applied. However, upon engagement of the parking brake, with a coinciding drainage of the parking brake circuit, the draining circuit, with the non-return valve, being adapted to drain the service brake circuit via the parking brake circuit, will provide for automatically drainage of the service brake circuit as well, thereby avoiding the risk of overloading the brake disc assembly by service brake application in addition to the parking brake application. Thus, the overload protection may be provided only with passive components, such as the non-return valve, and thereby a genuinely robust and reliable solution is provided. I.e. the solution for parking brake application and brake overload protection does not rely on any electric valves or software control, but will instead be operational automatically, e.g. upon a brake system power failure or a control system failure.

Preferably, where the brake control arrangement comprises a service brake control device adapted to selectively provide the fluid communication between the pressurising arrangement and the service brake via the service brake circuit, the parking brake circuit is adapted to provide the fluid communication between the parking brake and the pressurising arrangement independently of the service brake control device. Thereby, the parking brake may be controlled independently, and no manipulation of the service brake device is necessary in order to control the parking brake, for example to release the latter. The brake control arrangement comprises a parking brake control arrangement adapted to selectively provide the fluid communication between the pressurising arrangement and the parking brake via the parking brake circuit.

A working machine according to an aspect of the invention is provided comprising a vehicle brake system according to any embodiment herein. The working machine may be in the form a wheel loader or an articulated hauler. The invention is particularly beneficial where the working machine is provided with a plurality of wheels, and, at each wheel, an electric propulsion motor for transferring torque to the respective wheel. The reason for the electric motors at the wheels might be that the working machine comprises a series electric hybrid propulsion system or an electric propulsion system. As also suggested above, due to the lack of space in the hub, the parking brake and service brake assemblies may be integrated by allowing the parking brake and the service brake to share disc assemblies. The draining circuit for draining the service brake circuit to avoid overloading the brake disc assembly at parking brake release will thereby be advantageous.

A method for controlling a vehicle brake system according to an aspect of the invention is provided comprising a brake assembly providing a service brake and a parking brake having a brake disc assembly in common, a service brake circuit connectable to the service brake, and a parking brake circuit connectable to the parking brake, the method comprising controlling the vehicle brake system so as to assume a first state in which a fluid communication is provided between the parking brake and a pressurising arrangement, for keeping the parking brake released, and controlling the vehicle brake system so as to assume a second state in which the parking brake circuit is drained for applying the parking brake, characterised by draining the service brake circuit in the second state for avoiding overload of the brake disc assembly.

Preferably, the service brake circuit is drained while the parking brake circuit is drained. Preferably, the step of draining the service brake circuit in the second state comprises draining the service brake circuit via the parking brake circuit. Preferably, a fluid flow is allowed from the service brake circuit to the parking brake circuit, and a fluid flow is prevented from the parking brake circuit to the service brake circuit. Preferably, where the vehicle brake system comprises a service brake control device adapted to selectively provide a fluid communication between the pressurising arrangement and the service brake via the service brake circuit, the step of controlling the vehicle brake system so as to assume the first state comprises providing the fluid communication between the parking brake and the pressurising arrangement independently of the service brake control device.

A computer program according to an aspect of the invention is provided comprising program code means for performing the steps of said method according to any embodiment herein. A computer readable medium carrying a computer program according to an aspect of the invention is provided comprising program code means for performing the steps of said method according to any embodiment herein when said program is run on a computer.

A controller for a vehicle brake system, the vehicle brake system according to an aspect of the invention is provided comprising a brake assembly providing a service brake and a parking brake having, a brake disc assembly in common, a service brake circuit connectable to the service brake, and a parking brake circuit connectable to the parking brake, the controller being configured to control the vehicle brake system so as to assume a first state in which a fluid communication is provided between the parking brake and a pressurising arrangement, for keeping the parking brake released, and to control the vehicle brake system so as to assume a second state in which the parking brake circuit is drained for applying the parking brake, wherein the controller is configured to control the vehicle brake system so that the service brake circuit is drained in the second state for avoiding overload of the brake disc assembly.

Preferably, the controller is configured to control the vehicle brake system so that the service brake circuit is drained in the second state, while the parking brake circuit is drained. Preferably, the controller is configured to control the vehicle brake system so that in the second state the service brake circuit is drained via the parking brake circuit.

DESCRIPTION OF DRAWINGS

Below, embodiments of the invention will be described with reference to the drawings, in which.

DETAILED DESCRIPTION

Figure 1:
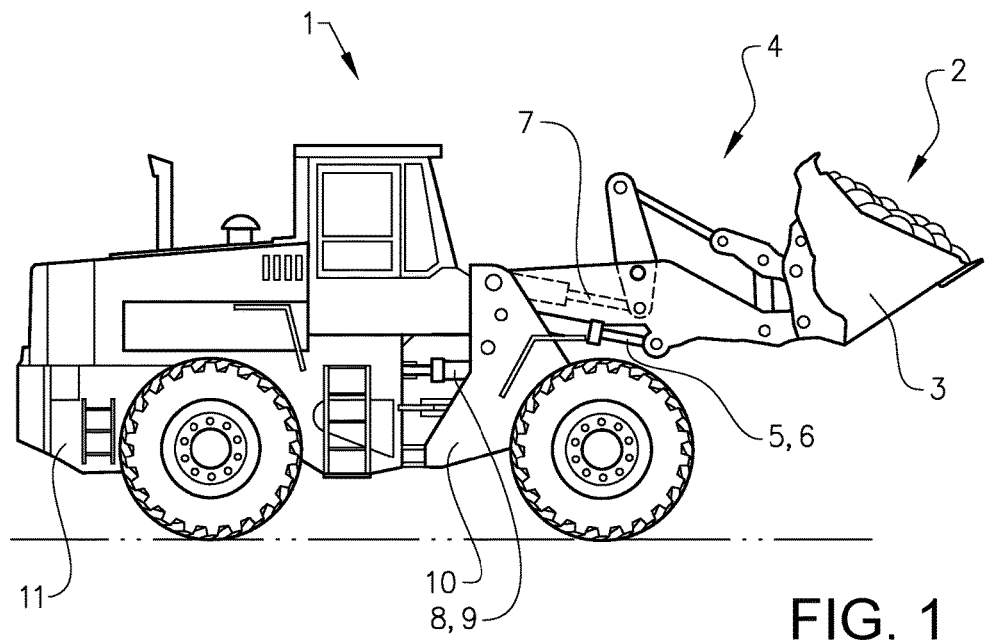
FIG. 1 is a lateral view of a wheel loader having a vehicle brake system according to an embodiment of the invention, FIG. 2 a perspective view of the wheel loader in FIG. 1, in which some internal components are shown.

FIG. 1 is an illustration of a working machine 1 in the form of a wheel loader. The wheel loader is an example of a working machine where a vehicle brake system according to a suitable embodiment of the invention can be applied.

The wheel loader 1 has an implement 2. The term "implement" is intended to comprise any kind of tool controlled by hydraulics, such as a bucket, a fork or a gripping tool. The implement 2 illustrated in FIG. 1 is a bucket 3 which is arranged on a load arm 4 for lifting and lowering the bucket 3. Further the bucket can be tilted relative to the load arm. In the example illustrated in FIG. 1, a hydraulic system of the wheel loader 1 comprises two hydraulic cylinders 5, 6 for the operation of the load arm 4 and one hydraulic cylinder 7 for tilting the bucket 3 relative to the load arm.

The hydraulic system of the wheel loader further comprises two hydraulic cylinders 8, 9, steering cylinders, arranged on opposite sides of the wheel loader 1 for turning the wheel loader by means of relative movement of a front body part 10 and a rear body part 11.

In other words: The wheel loader 1 is articulated and frame steered by means of the steering cylinders 8, 9. There is a pivot joint connecting the front body part 10 and the rear body part 11 of the wheel loader 1 such that these parts are pivotally connected to each other for pivoting about a substantially vertical axis.

Figure 2:
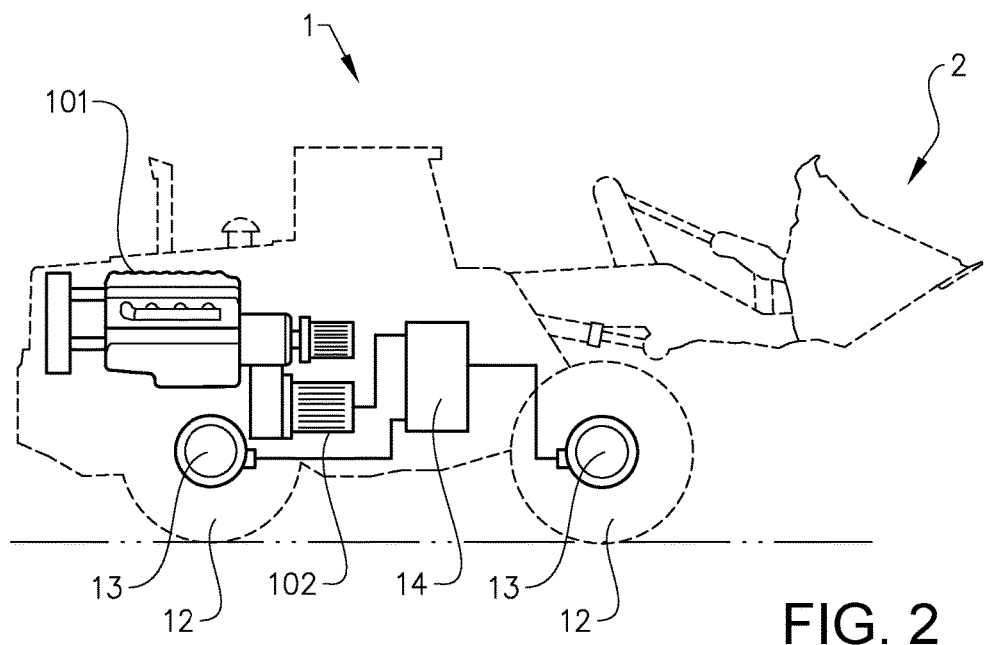

Reference is made to FIG. 2. The wheel loader 1 has an electric hybrid propulsion system. More specifically, the propulsion system is provided in a series electric hybrid configuration. An internal combustion engine 101 is connected to a generator 102, in turn connected to an electric storage arrangement in the form of a battery pack (not shown). The wheel loader 1 is provided with four wheels 12, i.e. two on each body part 10, 11. At each wheel 12 a torque control assembly 13 is provided. The torque control assemblies 13 are located in the hubs of the respective wheels 12.

It should be noted that the invention is applicable to working machines with other types of propulsion systems, e.g. fully electric propulsion systems. It should further be noted that in alternative applications, e.g. with hybrid propulsion systems, the working machine may be provided without any electric storage arrangement.

Figure 3:
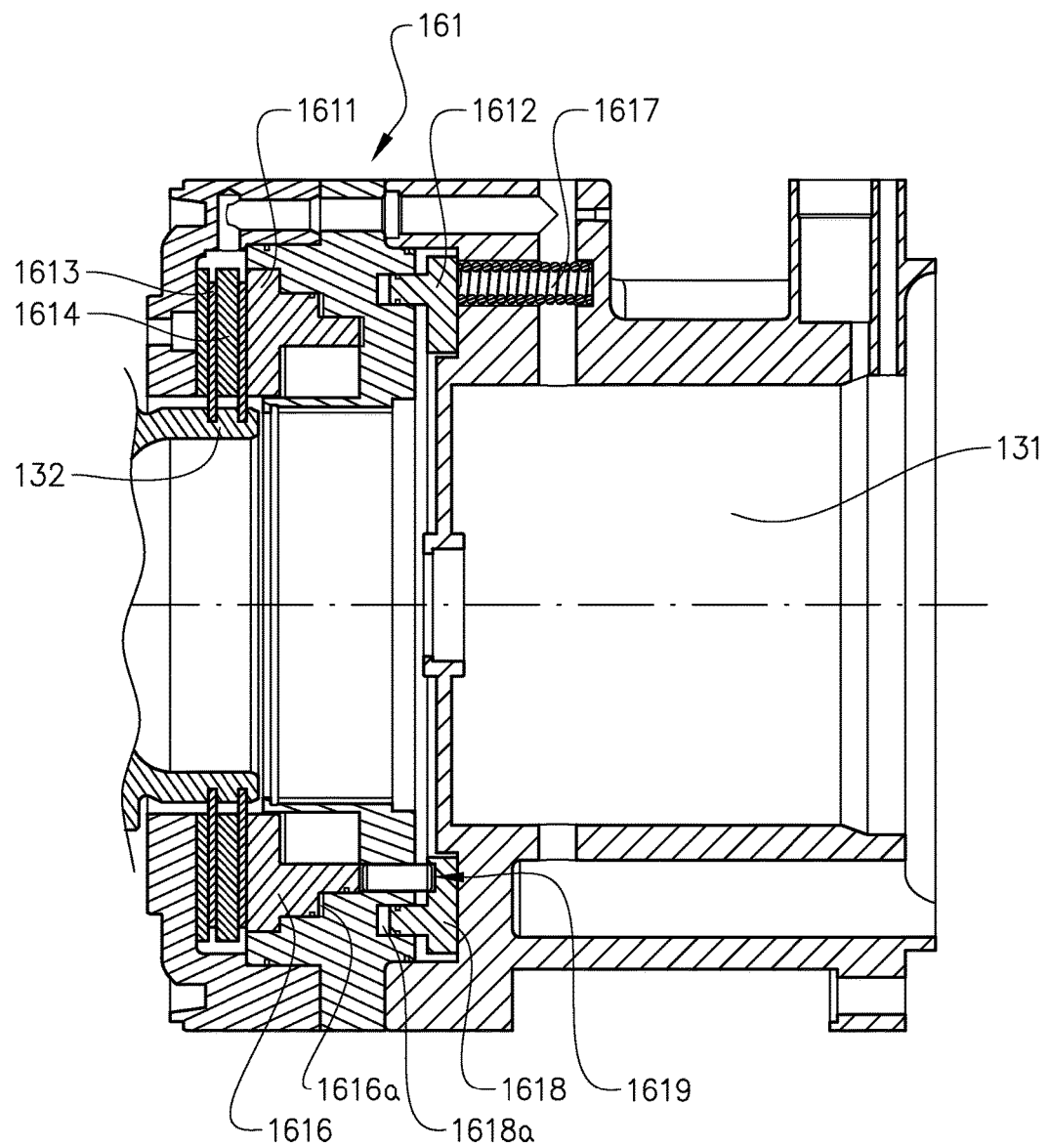
FIG. 3 is a cross-sectional view of a torque control assembly of the wheel loader in FIG. 1 and FIG. 2, the section coinciding, with a rotational axis of an electric motor of the torque control assembly.

As understood from FIG. 3, each torque control assembly 13 comprises an electric propulsion motor, which fits in a cavity indicated with the reference numeral 131 in FIG. 3, for transferring torque to the respective wheel 12. The electric motors are powered by the battery pack, and controlled by a control unit 14, (FIG. 2), herein also referred to as a controller 14. In addition to powering the electric motors 13, the battery pack is used for powering various devices in the wheel loader 1, such as one or more hydraulic pumps for powering the hydraulic cylinders 5, 6, 7 for the load arm 4 and the bucket tilting, and also the steering cylinders 8, 9, (FIG. 1).

Each torque control assembly 13 comprises in addition a brake assembly 161 of a vehicle brake system 16 described closer below. The brake assembly 161 comprises a service brake 1611 and a parking brake 1612 having a brake disc assembly 1613, 1614 in common. The brake disc assembly comprises a plurality of friction discs 1613 and stator discs 1614 as is known per se. The friction discs 1613 are fixed to a movable part 132 connected to a planetary transmission (not shown) of the respective torque control assembly 13, adapted to provide a rotational speed reduction when transferring torque from the motor to the wheel 12.

The service brake 1611 comprises a service brake piston 1616 which is adapted to exert a force onto the brake disc assembly 1613, 1614 by fluid pressure in a service brake cavity 1616a in communication with a service brake circuit 163 described below. The parking brake 1612 comprises a number of parking brake springs 1617, (one of which is shown in FIG. 3), and a parking brake piston 1618. The springs 1617 are adapted to exert pressure on the brake disc assembly 1613, 1614 via the parking brake piston 1618, pins 1619, and the service brake piston 1616, so as to apply the parking brake. The parking brake piston 1618 is arranged to counteract the three of the parking brake spring 1617 by fluid pressure in a parking brake cavity 1618a in communication with a parking brake circuit 164 described below.

Figure 4:
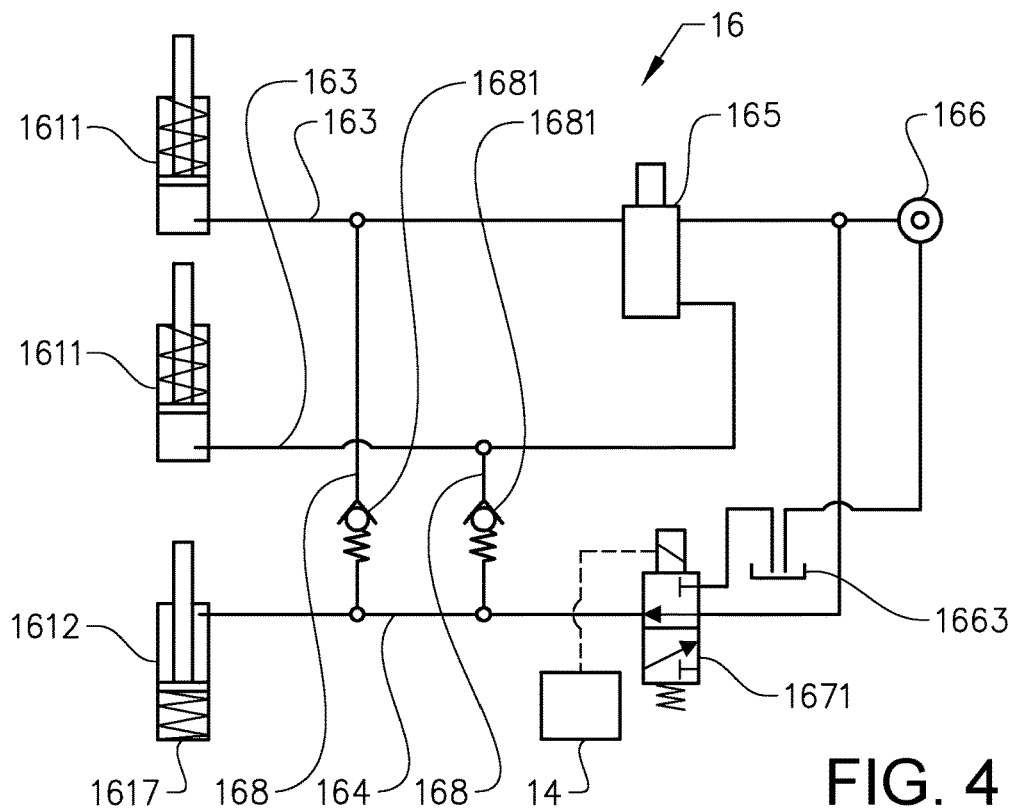
FIG. 4 shows a diagram of a vehicle brake system according to an embodiment of the invention, wherein a parking brake is released.

Reference is also made to FIG. 4. As mentioned above the service brake circuit 163 and the parking brake circuit 164 communicate with the service brake cavity 1616a and the parking brake cavity, respectively, (FIG. 3). The vehicle brake system 16 further comprises a pressurising arrangement 166 with a hydraulic pump and an accumulator, as is known per se. The pump of pressurising arrangement 166 is powered by the battery pack of the wheel loader 1. It should be noted that the pressurising arrangement 166 may be powered in any suitable alternative way, e.g. with a mechanical connection to the internal combustion engine 101 or to a transmission of the driveline.

Although the wheel loader preferably comprises four service brakes 1611, only two of them are shown in FIG. 4 for simplicity. The service brake circuit 163 comprises, for fault tolerance reasons, one partial circuit for the wheels 12 of the front body part 10, and another partial circuit for the wheels 12 of the rear body pan 11, one conduit of each partial circuit being shown in FIG. 44 brake control arrangement comprises a service brake control device in the form of a brake pedal 165 controllable by an operator of the wheel loader 1. The brake pedal 165 is adapted to control the service brakes 1611 by selectively providing a fluid communication between the pressurising arrangement 166 and the service brakes 1611 via the service brake circuit 163.

Although the wheel loader preferably comprises four parking brakes 1612, only one of them are shown in FIG. 4 for simplicity. The parking brake circuit 164 comprises one conduit for each parking brake, one of which conduits are shown in FIG. 4. The brake control arrangement further comprises a parking brake control arrangement 1671 in the form of a three way valve, herein also referred to as a parking brake control valve 1671. The parking brake control valve 1671 is adapted to be controlled by the controller 14, based on input to the controller, e.g. from a maneuvering device controllable by the operator of the wheel loader 1.

The parking brake 1612 is spring load activated and fluid pressure released. The parking brake control valve 1671 is connected to the parking brakes 1612, the pressurising arrangement 166 and a hydraulic return tank 1663. Thereby, the parking brake control valve 1671 is adapted to selectively provide a fluid communication either between the pressurising arrangement 166 and the parking brake 1612 via the parking brake circuit 164, or between the hydraulic return tank 1663 and the parking brake 1612 via the parking brake circuit 164. It should be noted that iii this embodiment, the parking brake circuit 164 is adapted to provide the fluid communication between the parking brake 1612 and the pressurising arrangement 166 independently of the brake pedal 165.

In FIG. 4 the parking brake control valve 1671 is in a position for connecting the pressurising arrangement 166 and the parking brake 1612. Thereby, pressure is provided for the parking brake piston 1618 (FIG. 3) to counteract the parking brake spring 1617, in order to keep the parking brake 1612 released.

As can be seen, in FIG. 4, the vehicle brake system also comprises a draining circuit 168. The draining circuit 168 comprises four conduits, two of which are shown in FIG. 4, each extending from a respective conduit on the service brake circuit 163 to a conduit in the parking brake circuit 164. Each conduit in the draining circuit 168 presents a non-return valve 1681 adapted to allow a flow from the service brake circuit 163 to the parking brake circuit 163, and to prevent a flow from the parking brake circuit 164 to the service brake circuit 163.

In FIG. 4 the parking brake circuit 164 is pressurised by the parking brake control valve 1671 providing the communication with the pressurising arrangement 166. While the parking brake circuit 164 is pressurised in this manner, the pressure in the service brake circuit 163 will, regardless, whether the service brake circuit 163 communicates with the pressurising, arrangement or not, not be higher than the pressure in the parking brake circuit 164. Therefore, while the parking brake circuit 164 is pressurised, no flow will be allowed from the service brake circuit 163 to the parking brake circuit via the non-return valves 1681 of the draining circuit 168.

Figure 5:
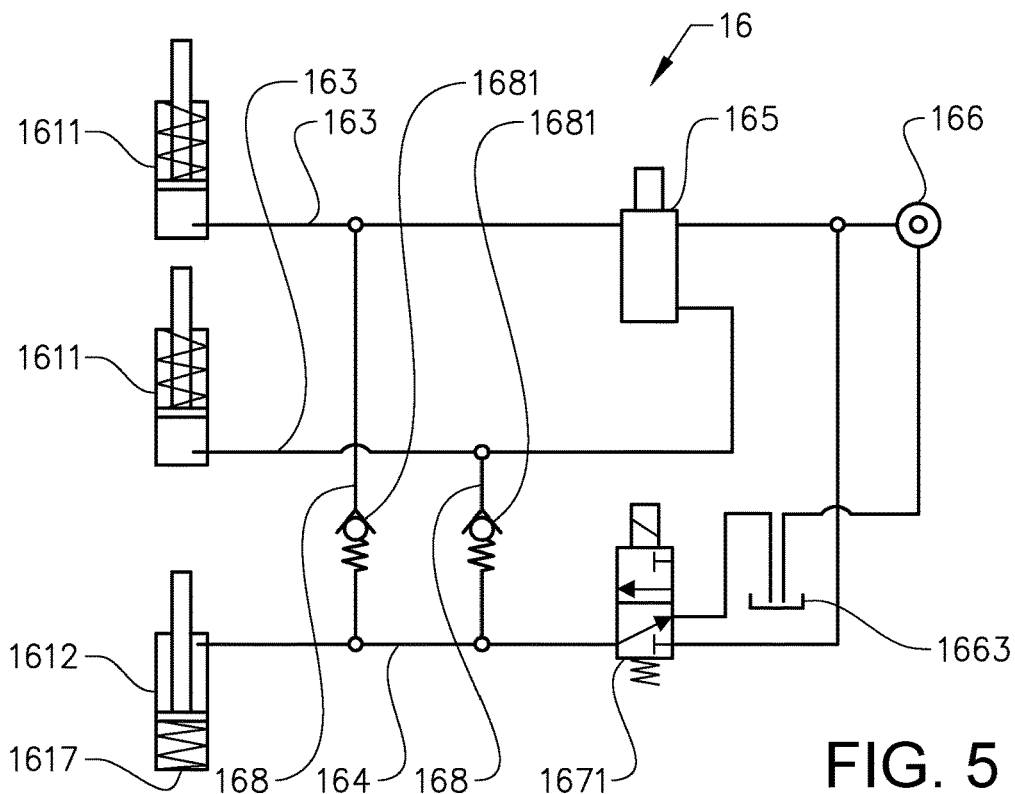
FIG. 5 shows the diagram in FIG. 4, wherein the parking brake is engaged.

In FIG. 5, the parking brake control valve 1671 is in a position for providing a communication between the parking brake 1612 and the hydraulic return tank 1663. Thereby, the parking brake circuit 164 is drained, the pressure in the parking brake circuit 164 is reduced, and the parking brake spring 1617 acts to engage the parking brake 1612.

In addition, when the parking brake circuit 164 is drained as in FIG. 5, the draining circuit 168 will provide for the service brake circuit 163 to be drained as well. The draining circuit 168 is adapted to drain the service brake circuit 163 via the parking brake circuit 164. Thus, any control of the brake pedal 165 to allow communication between the pressurising arrangement 166 and the service brake circuit 163 will not pressurise the service brake circuit 163, since the non-return valves 1681 of the draining circuit 168 provide a flow from the service brake circuit 163 to the parking brake circuit 164. Thus, while the parking brake 1612 is engaged, such con of the brake pedal 165 will not engage the service brakes 1611. Therefore overload of the brake disc assembly 1613, 1614 (FIG. 3) will be avoided.

Figure 6:
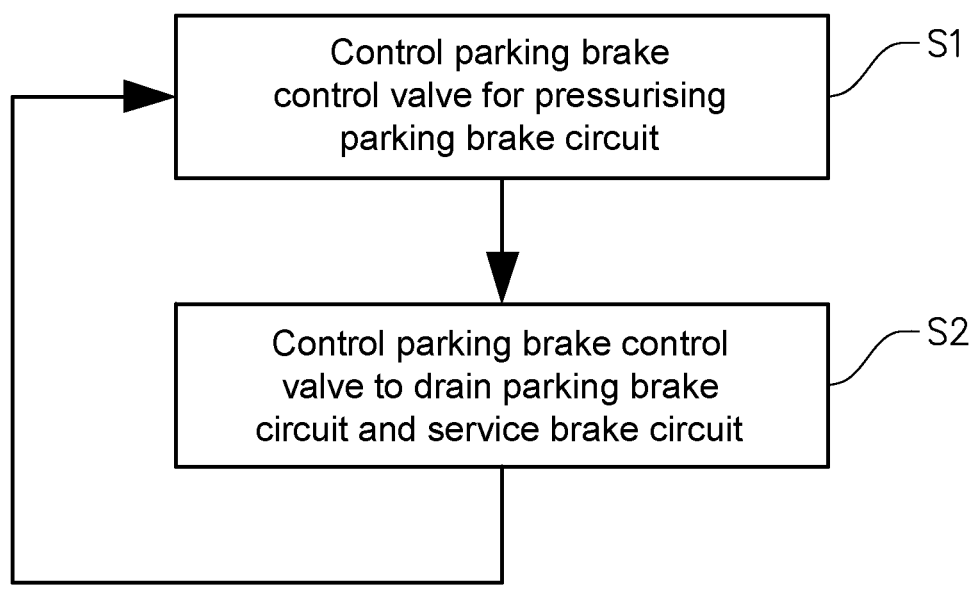
FIG. 6 depicts steps in a method for controlling the vehicle brake system in FIG. 4 and FIG. 5, and FIG. 7 and FIG. 8 show diagrams of vehicle brake systems according to alternative embodiments of the invention.

FIG. 6 depicts steps in a method for controlling the vehicle brake system in FIG. 4 and FIG. 5. In step S1 the controller 14 controls the parking brake control valve 1671 so as to assume the position shown in FIG. 4. Thereby, the vehicle brake system 16 assumes a first state in which the fluid communication is provided between the parking brake 1612 and a pressurising arrangement 166, for pressurising the parking brake circuit 164, and for keeping the parking brake 1612 released.

In step S2 the controller 14 controls the parking brake control valve 1671 so as to assume the position shown in FIG. 5. Thereby, the vehicle brake system 16 assumes a second state in which the parking brake circuit 164 is drained for applying the parking brake 1612. As understood from the description above with reference to FIG. 4 and FIG. 5, in the second state the service brake circuit 163 is drained via the draining circuit 168 and the parking brake circuit 164, for avoiding overload of the brake disc assembly.

Figure 7:
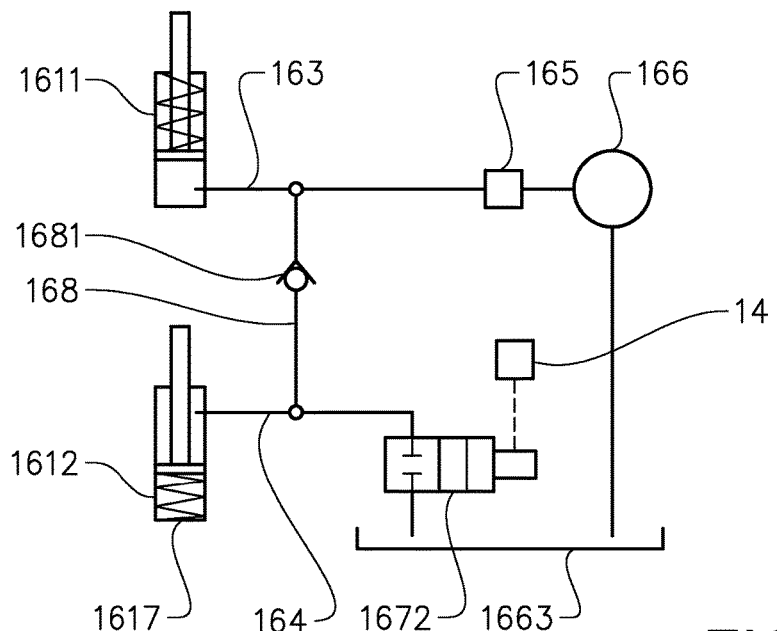

FIG. 7 depicts a vehicle brake system 16 according to an alternative embodiment of the invention. Although the wheel loader comprises four service brakes 1611 and four parking brakes 1612, only one of each are shown in FIG. 7 for simplicity. The embodiment in FIG. 7 shares features with the embodiment in FIG. 4 and FIG. 5, and here mainly the alternative features will be described.

In the embodiment in FIG. 7, the brake control arrangement comprises a parking brake control arrangement in the form of a parking brake control valve 1672 provided as a two way valve. The parking brake control valve 1672 is adapted to be controlled by the controller 14. The parking brake control valve 1672 is connected to the parking brakes 1612 and the hydraulic return tank 1663. Thereby, the parking brake control valve 1672 is adapted to selectively provide a fluid communication between the parking brake 1612 and the hydraulic return tank 1663 via the parking brake circuit 164.

It should be noted that in this embodiment, the parking brake circuit 164 is not adapted to provide any fluid communication between the parking brake 1612 and the pressurising arrangement 166 independently of the brake pedal 165. Where the parking brake control valve 1672 is in a position for blocking communication between the parking brake 1612 and the hydraulic return tank 1663, any activation of the brake pedal to allow communication between the service brake 1611 and the pressurising arrangement 166, will, to the extent the pressure is lower in the parking brake circuit 164 than in the service brake circuit 163, result in a flow via the non-return valve 1681 of the draining circuit 168, to increase the pressure in the parking brake circuit 164 to that of the service brake circuit 163. The increased pressure in the parking brake circuit 164 will release the parking brake 1612.

Also, where the parking brake control valve 1672 is in said position for blocking communication between the parking brake 1612 and the hydraulic return tank 1663, since the non-return valve 1681 of the draining circuit 168 will not allow any flow from the parking brake circuit 164 to the service brake circuit, the pressure in the parking brake circuit 163 will remain high also when the service brake circuit pressure is reduced, in order to keep the parking brake 1612 released.

If the parking brake control valve 1672 is moved to a position for providing a communication between the parking brake 1612 and the hydraulic return tank 1663, the parking brake circuit 164 is drained, and the parking brake spring 1617 acts to engage the parking brake 1612. In addition, similarly to the embodiment in FIG. 4 and FIG. 5, when the parking brake circuit 164 is drained, the draining circuit 168 will provide for the service brake circuit 163 to be drained as well, via the parking brake circuit 164. Therefore overload of the brake disc assembly 1613, 1614 (FIG. 3) will be avoided.

Figure 8:
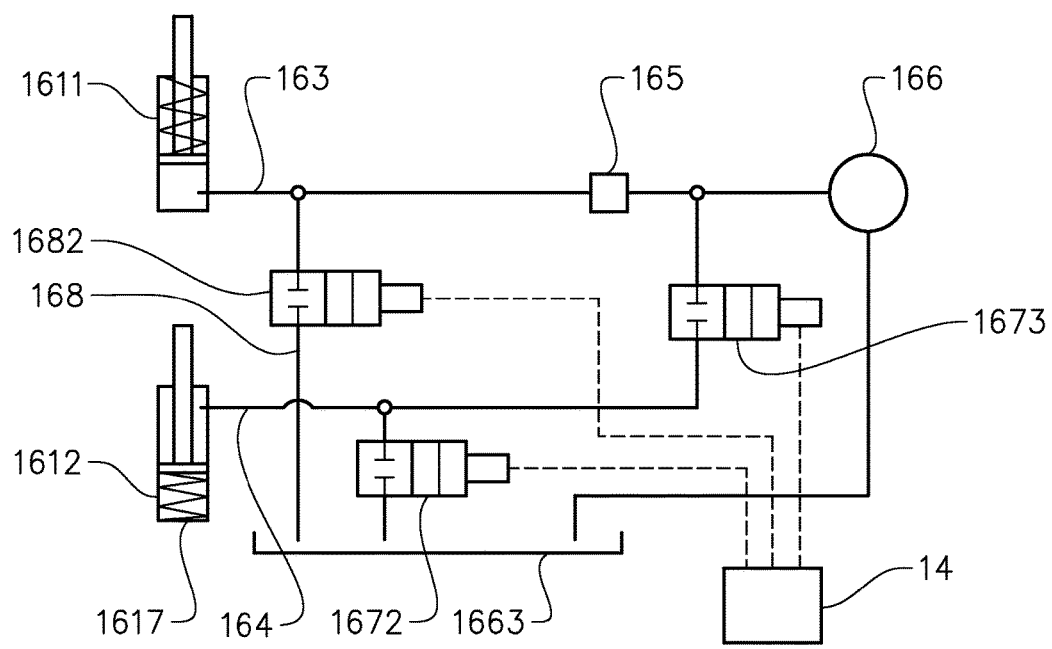

FIG. 8 depicts a vehicle brake system 16 according to a further alternative embodiment of the invention. The embodiment in FIG. 8 shares features with the embodiment in FIG. 7, and here mainly the alternative features will be described.

In the embodiment in FIG. 8, the brake control arrangement comprises a parking brake control arrangement including a first parking brake control valve 1672 provided as a two way valve, and a second parking brake control valve 1673 also provided as a two way valve. The parking brake control valves 1672, 1673 is adapted to be controlled by the controller 14. The first parking brake control valve 1672 is adapted to control a communication between the parking brake circuit 164 and the hydraulic return tank 1663. The second parking brake control valve 1673 is adapted to control a communication between the parking brake circuit 164 and the pressurising arrangement 166. Therefore, similarly to the embodiment in FIG. 4 and FIG. 5, the parking brake circuit 164 is adapted to provide a fluid communication between the parking brake 1612 and the pressurising arrangement 166 independently of the brake pedal 165.

In this embodiment, the draining circuit 168 comprises, instead of a non-return valve, a two way valve 1682, adapted to be controlled by the controller 14. In addition, the draining circuit 168 is adapted to allow a direct communication between the service brake circuit 163 and the hydraulic return tank 1663.

Where the parking brake 1612 is to be released, the controller 14 controls the draining circuit valve 1682 and the first parking brake control valve 1672 to be closed, and the controller 14 controls the second parking brake control valve 1673 to be open. Thereby the parking brake circuit 164 will be pressurised for keeping the parking brake 1612 released.

Where the parking brake 1612 is, to be engaged, the controller 14 controls the draining circuit valve 1682 and the first parking brake control valve 1672 to be open, and the controller 14 controls the second parking brake control valve 1673 to be closed. Thereby the parking brake circuit 164 will be drained for engaging the parking brake 1612. In addition, the draining circuit 168 will provide for the service brake circuit 163 to be drained as well, directly into the hydraulic return tank 1663. Therefore overload of the brake disc assembly 1613, 1614 (FIG. 3) will be avoided.

While embodiments of the invention have been described above with reference to a wheel loader with a hybrid propulsion system, it should be noted that the invention is also applicable to vehicles with other types of propulsion systems. For example, the invention is applicable to working machines with a traditional drive line with a combustion engine, e.g. a diesel engine, a transmission to transfer power, propeller shafts and an axle set with hubs, to which the wheels are attached.

In addition, the invention is applicable to other types of working machines, e.g. articulated haulers, tractors, or backhoe loaders. Further, the invention may also be provided as a vehicle, such as a bus, a truck or a private car, comprising a vehicle brake system as herein.

The invention claimed is:

1. A vehicle brake system comprising
a brake assembly providing a service brake and a parking brake having a brake disc assembly in common,
a service brake circuit,
a parking brake circuit, and
a brake control arrangement adapted to control the service brake by selectively providing a fluid communication between a pressurising arrangement and the service brake via the service brake circuit, the brake control arrangement further being adapted to control the parking brake by selectively providing a fluid communication between the pressurising arrangement and the parking brake via the parking brake circuit, and by selectively draining the parking brake circuit,
wherein the vehicle brake system comprises a draining circuit adapted to drain the service brake circuit to avoid overload of the brake disc assembly, and wherein the draining circuit is adapted to drain the service brake circuit while the parking brake circuit is drained.

2. A vehicle brake system according to claim 1, wherein the parking brake is spring load activated and fluid pressure released.

3. A vehicle brake system according to claim 1, wherein the draining circuit is adapted to drain the service brake circuit via the parking brake circuit.

4. A vehicle brake system according to claim 3, wherein the draining circuit comprises a non-return valve adapted to allow a fluid flow from the service brake circuit to the parking brake circuit, and to prevent a fluid flow from the parking brake circuit to the service brake circuit.

5. A vehicle brake system according to claim 1, wherein the brake control arrangement comprises a service brake control device adapted to selectively provide the fluid communication between the pressurising arrangement and the service brake via the service brake circuit.

6. A vehicle brake system according to claim 5, wherein the parking brake circuit is adapted to provide the fluid communication between the parking brake and the pressurising arrangement independently of the service brake control device.

7. A vehicle brake system according to claim 1, wherein the brake control arrangement comprises a parking brake control arrangement adapted to selectively provide the fluid communication between the pressurising arrangement and the parking brake via the parking brake circuit.

8. A working machine comprising a vehicle brake system according to claim 1.

9. A working machine according to claim 8, in the form a wheel loader or an articulated hauler.

10. A working machine according to claim 8, wherein the working machine is provided with a plurality of wheels, and, at each wheel, an electric propulsion motor for transferring torque to the respective wheel.

11. A working machine according to claim 10, wherein the working machine comprises a series electric hybrid propulsion system, or an electric propulsion system.

12. A method for controlling a vehicle brake system comprising a brake assembly providing a service brake and a parking brake having a brake disc assembly in common, a service brake circuit connectable to the service brake, and a parking brake circuit connectable to the parking brake, the method comprising
controlling the vehicle brake system so as to assume a first state in which a fluid communication is provided between the parking brake and a pressurising arrangement, for keeping the parking brake released, and
controlling the vehicle brake system so as to assume a second state in which the parking brake circuit is drained for applying the parking brake,
draining the service brake circuit in the second state for avoiding overload of the brake disc assembly, wherein the service brake circuit is drained while the parking brake circuit is drained.

13. A method according to claim 12, wherein the step of draining the service brake circuit in the second state comprising draining the service brake circuit via the parking brake circuit.

14. A method according to claim 13, wherein allowing a fluid flow from the service brake circuit to the parking brake circuit, and preventing a fluid flow from the parking brake circuit to the service brake circuit.

15. A method according to claim 12, where the vehicle brake system comprises a service brake control device adapted to selectively provide a fluid communication between the pressurising arrangement and the service brake via the service brake circuit, wherein the step of controlling the vehicle brake system so as to assume the first state comprises providing the fluid communication between the parking brake and the pressurising arrangement independently of the service brake control device.

16. A computer comprising a computer program for performing the steps of claim 12 when the program is run on the computer.

17. A non-transitory computer readable medium carrying a computer program for performing the steps of claim 12 when the program is run on a computer.

18. A controller for a vehicle brake system, the vehicle brake system comprising a brake assembly providing a service brake and a parking brake having a brake disc assembly in common, a service brake circuit connectable to the service brake, and a parking brake circuit connectable to the parking brake, the controller being configured
to control the vehicle brake system so as to assume a first state in which a fluid communication is provided between the parking brake and a pressurising arrangement, for keeping the parking brake released, and
to control the vehicle brake system so as to assume a second state in which the parking brake circuit is drained for applying the parking brake,
wherein the controller is configured to control the vehicle brake system so that the service brake circuit is drained in the second state for avoiding overload of the brake disc assembly, and wherein the controller is configured to control the vehicle brake system so that the service brake circuit is drained in the second state while the parking brake circuit is drained.

19. A controller according to claim 18, wherein the controller is configured to control the vehicle brake system so that in the second state the service brake circuit is drained via the parking brake circuit.

* * * * *